(12) United States Patent
Matsuda et al.

(10) Patent No.: US 12,092,984 B2
(45) Date of Patent: Sep. 17, 2024

(54) ELECTROPHOTOGRAPHY CLEANING BLADE, PROCESS CARTRIDGE, AND ELECTROPHOTOGRAPHIC IMAGE FORMATION DEVICE

(71) Applicant: CANON KABUSHIKI KAISHA, Tokyo (JP)

(72) Inventors: Hidekazu Matsuda, Shizuoka (JP); Arihiro Yamamoto, Shizuoka (JP); Toshirou Uchida, Shizuoka (JP); Kenya Terada, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/306,372

(22) Filed: Apr. 25, 2023

(65) Prior Publication Data

US 2023/0259062 A1    Aug. 17, 2023

Related U.S. Application Data

(63) Continuation of application No. PCT/JP2021/039331, filed on Oct. 25, 2021.

(30) Foreign Application Priority Data

Nov. 9, 2020 (JP) ................. 2020-186348

(51) Int. Cl.
*G03G 21/00* (2006.01)
*C08G 18/10* (2006.01)
(Continued)

(52) U.S. Cl.
CPC ......... *G03G 21/0017* (2013.01); *C08G 18/10* (2013.01); *C08G 18/32* (2013.01);
(Continued)

(58) Field of Classification Search
CPC ........... G03G 21/0011; G03G 21/0017; G03G 21/0029; G03G 2221/0005; C08G 18/10; C08G 18/32; C08G 18/42; C08G 18/66
See application file for complete search history.

(56) References Cited

U.S. PATENT DOCUMENTS 5,732,320 A    3/1998   Domagall et al.
9,632,474 B2   4/2017   Yamamoto et al.
(Continued)

FOREIGN PATENT DOCUMENTS

JP    8-179669 A      7/1996
JP    2006-084768 A   3/2006
(Continued)

OTHER PUBLICATIONS

International Search Report in International Application No. PCT/JP2021/039331 (Nov. 2021).

*Primary Examiner* — Sophia S Chen
(74) *Attorney, Agent, or Firm* — Venable LLP

(57) ABSTRACT

An electrophotographic cleaning blade, which includes the following: an elastic member containing polyurethane; and a support member supporting the elastic member, and cleaning a surface of a member to be cleaned in motion, by contact of part of the elastic member against the surface of the member to be cleaned, wherein the elastic member has, at least on the tip side, a plate shape having a main surface facing the member to be cleaned and a leading end surface that forms a tip side edge together with the main surface, and a coefficient of variation of area ratios of white regions in each of sections of a binarized image created from grayscale phase image obtained from the leading end surface, is 20.00 or less, and a value of HM1-HM2 is larger than 0.10 N/mm².

6 Claims, 7 Drawing Sheets

(51) Int. Cl.
*C08G 18/32* (2006.01)
*C08G 18/42* (2006.01)

(52) U.S. Cl.
CPC ......... *C08G 18/42* (2013.01); *G03G 21/0029* (2013.01); *G03G 2221/0005* (2013.01)

(56) References Cited

U.S. PATENT DOCUMENTS

| | | |
|---|---|---|
| 9,996,047 B2 | 6/2018 | Kawakami et al. |
| 10,042,315 B2 * | 8/2018 | Shimizu .............. G03G 21/0011 |
| 10,088,795 B2 | 10/2018 | Ikeda et al. |
| 10,942,482 B2 | 3/2021 | Miyagawa et al. |
| 11,630,411 B2 | 4/2023 | Yamamoto et al. |
| 2023/0236536 A1 * | 7/2023 | Ohmori .............. G03G 21/0017 399/101 |

FOREIGN PATENT DOCUMENTS

| | | |
|---|---|---|
| JP | 2018-077466 A | 5/2018 |
| JP | 2018-155955 A | 10/2018 |
| JP | 2019-132982 A | 8/2019 |
| WO | 2022/097526 A1 | 5/2022 |

* cited by examiner

ELECTROPHOTOGRAPHY CLEANING BLADE, PROCESS CARTRIDGE, AND ELECTROPHOTOGRAPHIC IMAGE FORMATION DEVICE

CROSS-REFERENCE TO RELATED APPLICATION

This is a continuation of International Application No. PCT/JP2021/039331, filed on Oct. 25, 2021, and designated the U.S., and claims priority from Japanese Patent Application No. 2020-186348 filed on Nov. 9, 2020, the entire contents of which are incorporated herein by reference.

BACKGROUND OF THE INVENTION

Technical Field of the Invention

The present disclosure relates to an electrophotography cleaning blade, a process cartridge, and an electrophotographic image formation device.

Description of the Related Art

An electrophotographic apparatus is provided with a cleaning member for the purpose of removing toner that remains on an image bearing member, such as a photosensitive member, after transfer of a toner image from the image bearing member onto a transfer-receiving body, such as a sheet of paper or an intermediate transfer member. As the cleaning member, a cleaning blade having a plate-shaped elastic member is often used. To meet the growing demand for higher image quality of electrophotographic images in recent years, the size of toner particles has become smaller, and cleaning by a cleaning blade has become increasingly difficult.

Against this background Japanese Patent Application Publication No. 2018-77466 discloses, as a cleaning blade capable of delivering excellent cleaning performance, a cleaning blade that is provided with an elastic member having a urethane rubber, and a support member that supports the elastic member, and the cleaning blade has an edge at a free end portion of the elastic member and a first surface and a second surface that make up the edge, with at least one from among the first surface and the second surface having a cured surface, and has specific physical properties.

SUMMARY OF THE INVENTION

Studies by the inventors have revealed that the cleaning blade according to Japanese Patent Application Publication No. 2018-77466 still has room for improvement in terms of resistance to tuck-up under harsh usage situations. Specifically, tuck-up may occur and cleaning performance worsen, for instance, as a result of long-term use in an electrophotographic image forming apparatus at high process speeds.

At least one aspect of the present disclosure is directed to providing an electrophotographic cleaning blade that can deliver excellent cleaning performance even under harsh usage situations. At least one aspect of the present disclosure is directed to providing a process cartridge and an electrophotographic image forming apparatus that contribute to stable formation of high-quality electrophotographic images.

According to at least one aspect of the present disclosure, there is provided an electrophotographic cleaning blade comprising:

an elastic member containing polyurethane; and
a support member supporting the elastic member,
the electrophotographic cleaning blade cleaning a surface of a member to be cleaned in motion, by contact of part of the elastic member against the surface of the member to be cleaned, wherein when a side of the cleaning blade that comes in contact with the surface of the member to be cleaned is defined as a tip side of the cleaning blade, the elastic member has, at least on the tip side, a plate shape having a main surface facing the member to be cleaned and a leading end surface that forms a tip side edge together with the main surface;

assuming that a first line segment having a distance of 10 μm from the tip side edge is drawn on the leading end surface in parallel with the tip side edge, a length of the first line segment is denoted as L, and a point at ½L from one end side on the first line segment is denoted as P1;

when scanning of a square region of the leading end surface, the square region having a barycenter at the P1, having a side length of 20 μm and having one side parallel to the first line segment, by using a scanning probe microscope under conditions that involve a scanning speed of 1 Hz, and 256 vertical and 256 horizontal scanning points, to acquire a 256-gradation grayscale phase image, as a viscoelastic image of the square region, creating a binarized image with a threshold value at a 93rd gradation from the lowest gradation side in a brightness frequency distribution obtained from the phase image so that portions at or above the threshold value are depicted in black and portions below the threshold value are depicted in white, partitioning the binarized image into 100 sections each being a 2-μm-side square, and obtaining a coefficient of variation of area ratios of white regions in each of the sections on the basis of the area ratios, an average value AM of the area ratios of the white regions, and a standard deviation Σ of the area ratios of the white regions, the coefficient of variations is 20.00 or less, and assuming that a bisector of an angle formed by the main surface and the leading end surface on a cross section of the elastic member is drawn, the cross section being orthogonal to the leading end surface encompassing the P1 and to the tip side edge, a value of HM1-HM2 is larger than 0.10 N/mm$^2$, where HM1 is a Martens hardness of the elastic member as measured at the positon of the P1, and HM2 is a Martens hardness of the elastic member as measured at a positon on the bisector at a distance of 500 μm from the tip side edge.

According to at least another aspect of the present disclosure, there is provided a process cartridge having the above electrophotographic cleaning blade. Further, according to at least another aspect of the present disclosure, there is provided an electrophotographic image forming apparatus having the above electrophotographic cleaning blade.

Further features of the present disclosure will become apparent from the following description of exemplary embodiments with reference to the attached drawings.

DESCRIPTION OF THE EMBODIMENTS

In the present disclosure, the descriptions of "XX or more and YY or less" or "XX to YY" representing numerical ranges mean numerical ranges including the lower and upper limits, which are endpoints, unless otherwise specified. When numerical ranges are stated stepwise, the upper and lower limits of each numerical range can be combined arbitrarily.

Examples of the member to be cleaned to which the electrophotographic cleaning blade according to one aspect of the present disclosure (hereinafter, also simply referred to as "cleaning blade") is applied include an image bearing member such as a photosensitive member, and an endless belt such as an intermediate transfer belt. An embodiment of the cleaning blade according to one aspect of the present disclosure will be described in detail hereafter by illustrating an image bearing member as an example of the member to be cleaned; however, the present disclosure is not limited thereto.

<Structure of a Cleaning Blade>

Figure 1:
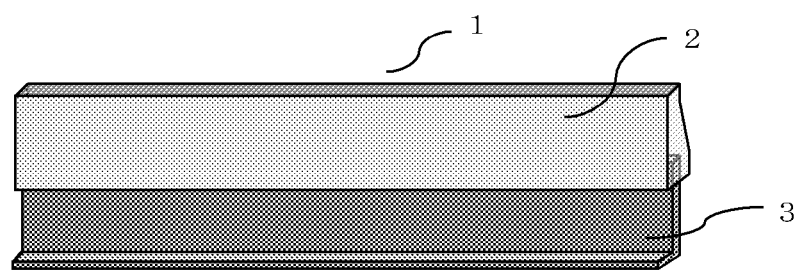
FIG. 1 is a schematic perspective-view diagram of an electrophotographic cleaning blade.

FIG. 1 is a schematic perspective-view diagram of a cleaning blade according to one aspect of the present disclosure. A cleaning blade 1 includes an elastic member 2 and a support member 3 that supports the elastic member 2.

Figure 2:
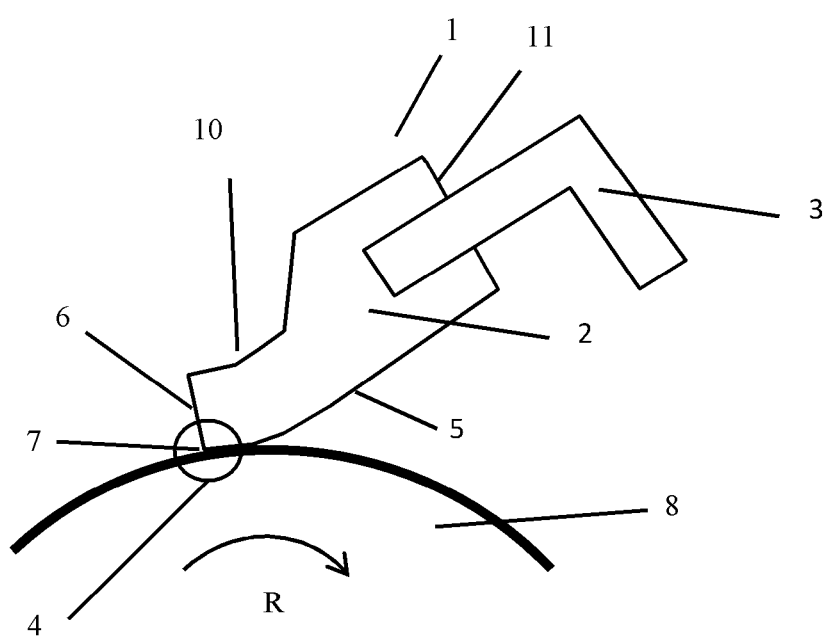
FIG. 2 is a cross-sectional schematic diagram of a state in which an electrophotographic cleaning blade is in contact with a member to be cleaned.

FIG. 2 is a cross-sectional schematic diagram of a state in which a cleaning blade according to one aspect of the present disclosure is in contact with a member to be cleaned. A portion of the elastic member 2 of the cleaning blade 1 is brought into contact with the surface of a member to be cleaned 8 in motion, to thereby clean the surface of the member to be cleaned 8.

Defining the side of the cleaning blade 1 that comes into contact with the surface of the member to be cleaned 8 as a tip side of the cleaning blade, the elastic member 2 has, at least on the tip side, a main surface 5 that faces the member to be cleaned 8, and a leading end surface 6 which forms a tip side edge 7 together with the main surface 5.

In FIG. 2, the reference symbol 4 denotes a tip portion, 10 denotes a surface opposite to the main surface 5, the reference symbol 11 denotes the surface on the side on which the support member 3 is installed, and the reference symbol R denotes the rotation direction of the member to be cleaned.

The inventors have found that for instance a cleaning blade that satisfies Requirements (1) and (2) set forth below allows suppressing the occurrence of tuck-up at a contact region with the member to be cleaned, and allows bringing out excellent cleaning performance even under harsh usage situations.

Figure 3:
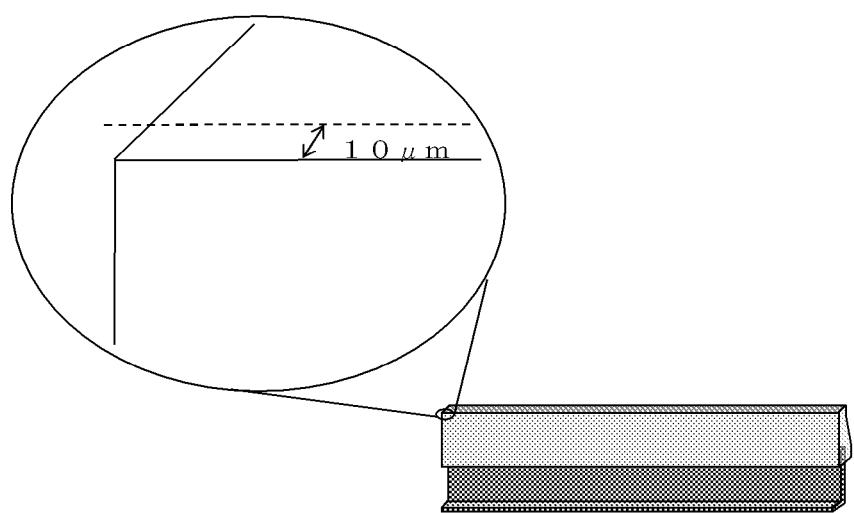
FIG. 3 is a diagram illustrating a first line segment at a distance of 10 μm from a tip side edge.
Figure 4:
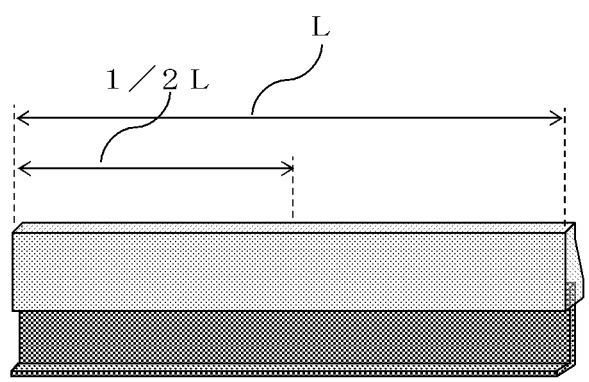
FIG. 4 is a diagram illustrating a point at ½L from one end side, on a first line segment.
Figure 5:
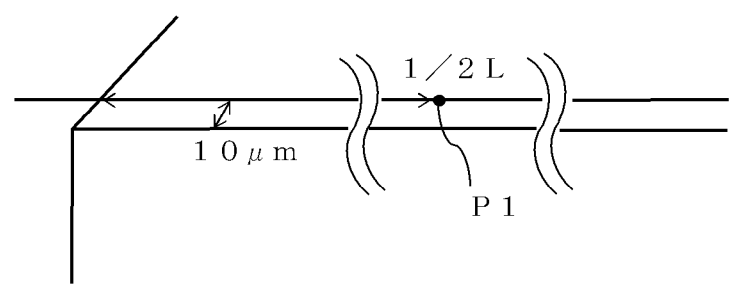
FIG. 5 is a diagram illustrating the position of P1.
Figure 6:
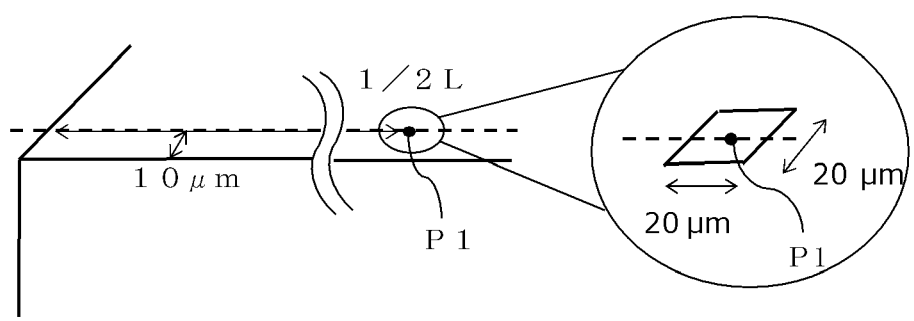
FIG. 6 is a diagram illustrating a square with barycenter at P1 and having a side length of 20 μm.

(1) Assuming that a first line segment is drawn on the leading end surface of the cleaning blade parallelly to the tip side edge and at a distance of 10 μm from the tip side edge, a length of the first line segment is defined as L;

a point at ½L from one end side on the first line segment is defined as P1 (see FIG. 3, FIG. 4 and FIG. 5), a square region (see FIG. 6) of the leading end surface with barycenter at P1, having a side length of 20 μm and having one side parallel to the first line segment is scanned using a scanning probe microscope, under conditions that involve a scanning speed of 1 Hz, and 256 vertical and 256 horizontal scanning points, whereupon a 256-gradation grayscale phase image is acquired, as a viscoelastic image of the above region. Setting a threshold value at a 93rd gradation from the lowest gradation side in a brightness frequency distribution obtained from the phase image, a binarized image is thereupon created with portions at or above the threshold value being depicted in black and portions below the threshold value being depicted in white. The binarized image is further divided into 100 sections each being a 2-μm-side square, and then there are worked out the area ratio of a white region in each section and a coefficient of variation of the area ratios of the white regions, on the basis of an average value AM of the area ratios of the white regions and a standard deviation Σ of the area ratios of the white regions. The coefficient of variation thus obtained is 20.00% or lower. The coefficient of variation is preferably 10.00% or lower. The lower limit of the coefficient of variation is 0.00%. The coefficient of variation (%) is calculated as (100×Σ/AM), where AM is the average value of the area ratios and Σ is the standard deviation of the area ratios.

A polyurethane contained in the elastic member is ordinarily made up of hard segments and soft segments. The hard segments and the soft segments have dissimilar elastic moduli. The "white regions" in the above binarized image denote a relatively higher elastic modulus than that in the "black regions".

Conventional polyurethanes (for instance polyurethane elastomers) have ordinarily large hard segments on account of hard segment aggregation. In addition, the density of hard segments and soft segments may be distributed unevenly. A cleaning blade made up of such polyurethane may exhibit uneven contact pressure against the member to be cleaned, in the longitudinal direction of the cleaning blade. It is deemed that as a result of this unevenness, the contact state at the tip side edge becomes unstable, and that tuck-up occurs under high-speed process conditions.

In the cleaning blade according to the present disclosure, by contrast, the coefficient of variation of area ratios of white regions is 20.00 or less, as described above; as a result, unevenness in the density distribution of the hard segments and the soft segments becomes smaller, and the hard segments and soft segments are present more uniformly than in a conventional polyurethane. Therefore, the occurrence of tuck-up of the cleaning blade can be suppressed also in a case where the cleaning blade is used in an even higher speed electrophotographic image formation process.

The average value AM of the area ratios of the white regions is preferably 45.0% or higher, more preferably 55.0% or higher, and yet more preferably 65.0% or higher. Conversely, the average value AM of the area ratios of the white regions is preferably 80.0% or lower, and more preferably 75.0% or lower.

When the average value AM of the area ratios of the white regions satisfies the above ranges, the coefficient of variation of the area ratio of the white regions can be readily adjusted to lie within the above ranges, and cleaning performance can be further improved.

Figure 7:
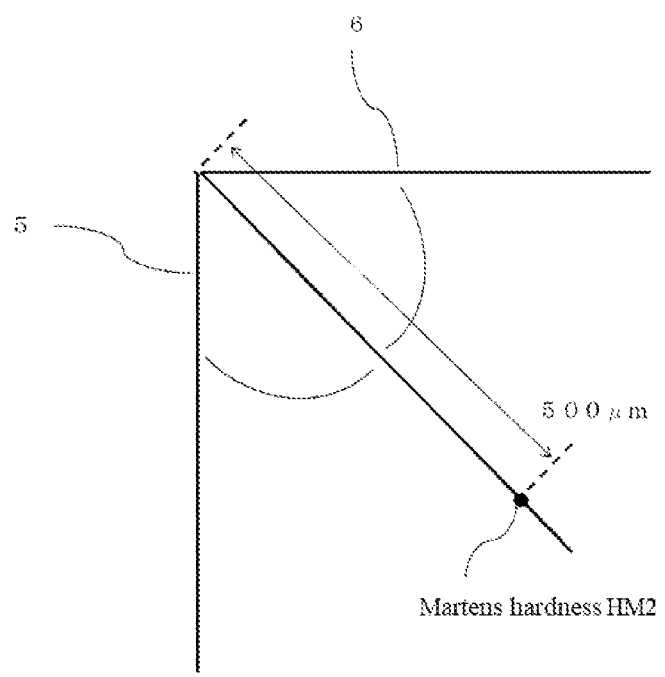
FIG. 7 is a diagram illustrating the position at which a Martens hardness HM2 is measured.

(2) Assuming that a bisector of an angle formed by the main surface and the leading end surface, on a cross section, of the elastic member, perpendicular to the leading end surface and the tip side edge and that encompasses P1 is drawn, a value (see FIG. 7) resulting from subtracting a Martens hardness HM2 of the elastic member as measured at a position, on the bisector, at a distance of 500 μm from the tip side edge, from a Martens hardness HM1 of the elastic member as measured at the position of P1, is larger than $0.10 \text{ N/mm}^2$.

The value resulting from subtracting HM2 from HM1 is preferably $0.14 \text{ N/mm}^2$ or higher, and more preferably $0.25 \text{ N/mm}^2$ or higher. Conversely, value resulting from subtracting HM2 from HM1 is preferably $5.00 \text{ N/mm}^2$ or lower, and more preferably $3.00 \text{ N/mm}^2$ or lower.

Means for increasing the value resulting from subtracting HM2 from HM1 include for instance methods such as surface treatments. A surface treatment allows herein increasing the elastic modulus of the cleaning blade surface and enhancing the hardness of the surface.

The occurrence of tuck-up is rendered unlikelier by hardening the vicinity of the tip side edge that comes in contact with the member to be cleaned. By contrast, when the totality of the cleaning blade becomes harder, it is in turn difficult to absorb disturbances such as micro-vibrations derived from rubbing against the member to be cleaned and derived from and apparatus vibrations, and tuck-up occurs readily under process conditions that involve higher speeds. Therefore, by prescribing the value resulting from subtracting the Martens hardness HM2 from the Martens hardness HM1 to be larger than $0.10 \text{ N/mm}^2$ as in the present disclosure it becomes possible to suppress more reliably the occurrence of tuck-up of the cleaning blade, even when the speed of the electrophotographic image formation process is increased.

[Support Member]

The material that makes up the support member of the cleaning blade is not particularly limited, and examples thereof include the following materials. For instance metallic materials such as steel sheets, stainless steel sheets, galvanized steel sheets, chromium-free steel sheets, and resin materials such as 6-nylon and 6,6-nylon. Likewise, the structure of the support member is not particularly limited. One end of the elastic member of the cleaning blade is supported by a support member, as illustrated for instance in FIG. 2.

[Elastic Member]

The polyurethane contained in the elastic member is preferably a polyurethane elastomer.

A polyurethane elastomer is obtained mainly from starting materials such as polyols, chain extenders, polyisocyanates, catalysts and other additives.

The polyurethane elastomer is a block copolymer made up of hard segments and soft segments. Herein one non-limiting method for obtaining a cleaning blade such that the coefficient of variation of white regions is 20.00%, according to the present disclosure, involves exploiting the characteristics of a block copolymer made up of the above hard segments and soft segments.

In a conventional polyurethane, aggregated portions of urethane bonds, resulting from aggregation through interactions of urethane bonds, have comparatively large hard segments that result from further aggregation. Studies by the inventors have revealed that, as a result, a wiper blade produced using such a conventional polyurethane does not satisfy the coefficient of variation according to the present disclosure. That is, conventional polyurethanes have comparatively large hard segments, and hence it has been difficult to bring the coefficient of variation of white regions down to 20.00% or below.

A cleaning blade according to one aspect of the present disclosure may be formed for instance through fine and uniform dispersion of hard segments.

Several examples of polyurethanes in which hard segments are finely and uniformly dispersed will be explained below. However, the constituent materials of an elastic portion according to the present disclosure are not limited to these polyurethanes.

A polyurethane resulting from fine and uniform dispersion of hard segments, with suppressed hard segment aggregation, can be obtained herein through the use of urethane starting materials in the form of a diisocyanate or trifunctional or higher polyfunctional isocyanate and a diol or trifunctional or higher polyfunctional alcohol, within appropriate concentration ranges.

Specifically, for instance at least one from among an alcohol including a trifunctional or higher polyfunctional alcohol, and an isocyanate compound including a trifunctional or higher polyfunctional isocyanate are preferably used as urethane starting materials.

Also preferable is to use, as urethane starting materials, an alcohol including at least one selected from among diols and trifunctional or higher polyfunctional alcohols, and an isocyanate compound including a trifunctional or higher polyfunctional isocyanate.

Likewise preferable is to use, as urethane starting materials, an alcohol including a trifunctional or higher polyfunctional alcohol, and an isocyanate compound including a diisocyanate and a trifunctional or higher polyfunctional isocyanate. Particularly preferably, a trifunctional or higher polyfunctional alcohol and a trifunctional or higher polyfunctional isocyanate are used as urethane starting materials.

A polyurethane obtained as a reaction product of a trifunctional or higher polyfunctional alcohol and a trifunctional or higher polyfunctional isocyanate exhibits suppressed molecular orientation, on account of steric hindrance, such that hard segment aggregation is yet more reliably suppressed. As a result, the polyurethane is a suitable polyurethane in terms of achieving the elastic modulus and coefficient of variation according to the present disclosure.

Also, crystallinity is enhanced, through stacking of soft segments, in a case where soft segment portions have for instance a linear alkylene structure. As a result, hard segments do not disperse readily. Accordingly, also introduction of an alkylene structure having a side chain portion into the soft segment portions is herein effective in suppressing hard segment aggregation. Specifically, for instance introduction of substructures such as those represented by the following Structural formulae (i) to (iv) into soft segment portions between two urethane bonds is effective in terms of making hard segments smaller.

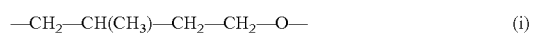
(i)

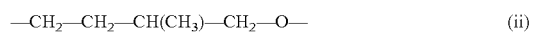
(ii)

(iii)

(iv)

The structures in Structural formulae (i) and (ii), which are substantially identical, result from ring-opening polymerization of 3-methyltetrahydrofuran. The structures in Structural formulae (iii) and (iv), which are substantially identical, result from ring-opening polymerization of 1,2-propylene oxide. A urethane resin having these structures between two adjacent urethane bonds can be obtained herein by causing a polyether polyol or polyester polyol having these structures to react with an isocyanate. It is ordinarily difficult to achieve fine dispersion of hard segments in a case where a bifunctional alcohol (diol) and a bifunctional isocyanate (diisocyanate) are used as urethane starting materials. However, hard segments can be finely dispersed, even when using a diol and a diisocyanate, by introducing the above substructures into the soft segment portions. A polyurethane can be obtained as a result that yields a wiper blade satisfying the parameters according to the present disclosure.

Methods for suppressing crystallization derived from soft segment stacking and preventing hard segment aggregation, other than by introducing side chains into soft segment portions as described above, include for instance methods that involve utilizing two or more types of alcohol having straight-chain portions with dissimilar numbers of carbon atoms, as the alcohol among the urethane starting materials. In polyurethanes obtained by using two or more types of alcohols having straight-chain portions with dissimilar numbers of carbon atoms, crystallization derived from stacking of soft segments can be suppressed, by virtue of the fact that the numbers of carbon atoms are dissimilar, also when the soft segment portions have a straight-chain alkylene structure. Given that the number of carbon atoms in the soft segment portions are thus dissimilar, aggregation of urethane bond portions is accordingly suppressed, which as a result allows preventing hard segment aggregation. The hard segments can therefore be made smaller also in a case where a diisocyanate and a diol having a straight-chain alkylene structure in the molecule are utilized as urethane starting materials, by using herein, as the above diol, a plurality of diols having different numbers of carbon atoms in the straight-chain alkylene structure. A polyurethane can be obtained as a result that yields a wiper blade satisfying the parameters according to the present disclosure. Examples of multiple types of diol include for instance the concomitant use of a polybutylene adipate polyester polyol and a polyhexylene adipate polyester polyol.

Examples of alcohols as urethane starting materials include for instance the following polyols.

Polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol; polycaprolactone-based polyols obtained through ring-opening polymerization of caprolactone; polyether polyols such as polyethylene glycol, polypropylene glycol and polytetramethylene glycol; as well as polycarbonate diol. The foregoing may be used singly or in combinations of two or more types.

Preferred among the above polyols are polyester polyols that utilize an adipate, since in that case a polyurethane elastomer is obtained that exhibits excellent mechanical characteristics.

More preferable is a polyol that utilizes an alkylene group having four or more carbon atoms, such as a polybutylene adipate polyester polyol or a polyhexylene adipate polyester polyol.

Preferably, polyols having dissimilar numbers of alkylene group carbons, such as polybutylene adipate polyester polyol and polyhexylene adipate polyester polyol, are concomitantly used herein.

As the alcohol there are preferably used two or more types of polyol having straight-chain portions (alkylene chains) with dissimilar numbers of carbon atoms, as described above, since in that case a urethane is obtained in which soft segment crystallization is inhibited and hard segment aggregation is suppressed. In this case there are preferably used for instance at least two selected from the group consisting of polyester polyols such as polyethylene adipate polyester polyol, polybutylene adipate polyester polyol, polyhexylene adipate polyester polyol, (polyethylene/polypropylene) adipate polyester polyol, (polyethylene/polybutylene) adipate polyester polyol and (polyethylene/polyneopentylene) adipate polyester polyol.

Also a diol or a trifunctional or higher polyfunctional alcohol capable of extending polyurethane elastomer chains may be used as the above chain extender.

Examples of diols include the following.

Ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (terephthalyl alcohol) and triethylene glycol. The foregoing may be used singly or in combinations of two or more types.

Examples of the trifunctional or higher polyfunctional alcohol include trimethylolpropane (TMP), glycerin, pentaerythritol and sorbitol. The foregoing may be used singly or in combinations of two or more types.

One method for generating "white regions" in the binarized image, i.e. of generating regions of relatively high elastic modulus, may involve for instance introducing a crosslinked structure.

A preferred method for introducing a crosslinked structure involves using a trifunctional or higher polyfunctional alcohol as the chain extender. Introducing a branched structure into a polyurethane by using a trifunctional or higher polyfunctional alcohol allows herein suppressing polyurethane crystallization and further suppressing hard segment aggregation. Preferably, a trifunctional alcohol is used as the polyfunctional alcohol, from the viewpoint of suppressing excessive increases in hardness derived from an excessively high degree of crosslinking of the polyurethane. Preferred among the foregoing are triols, since these have a methylene skeleton adjacent to hydroxyl groups, can yield a flexible crosslinked structure in the molecular structure, and elicit the effect of further suppressing hard segment crystallinity. Examples of such triols include for instance trimethylolpropane (TMP) and glycerin.

Examples of Isocyanates Include the Following.

4,4'-diphenylmethane diisocyanate (4,4'-MDI), polymeric MDI, 2,4-tolylene diisocyanate (2,4-TDI), 2,6-tolylene diisocyanate (2,6-TDI), xylene diisocyanate (XDI), 1,5-naphthylene isocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-modified MDI, triphenylmethane-4,4',4"-triisocyanate (TTI) and tris(phenylisocyanate)thiophosphate (TPTI).

Preferred among the foregoing is 4,4'-MDI, since the two isocyanate groups thereof have commensurate reactivity, and the compound affords high mechanical characteristics. Preferably, a trifunctional or higher polyfunctional isocyanate is used concomitantly. Using herein a trifunctional or higher polyfunctional isocyanate allows introducing a branched structure into the polyurethane, and is effective in terms of further suppressing hard segment aggregation. Moreover, a denser crosslinked structure can be introduced into the polyurethane, and hence contactability of the elastic portion against the member to be cleaned can be made more stable. It becomes possible as a result to effectively suppress wiping streaks and uneven wiping in the member to be cleaned. Examples of the trifunctional or higher polyfunctional isocyanate include at least one selected from the group consisting of triphenylmethane-4,4',4''-triisocyanate (TTI), tris(phenylisocyanate)thiophosphate (TPTI) and polymeric MDI. Among the foregoing, tris(phenylisocyanate) thiophosphate (TPTI) and polymeric MDI can be used more suitably. These isocyanates have methylene groups or ether groups between multiple NCO groups, such that distances between multiple urethane bonds can be maintained properly. These isocyanates are accordingly advantageous in terms of suppressing hard segment aggregation.

Polymeric MDI is represented by the following chemical formula (1-1) and Chemical formula (1-2). In Chemical formula (1-2), n represents an integer equal to or greater than 2. The upper limit of n is not particularly restricted, but, for instance, is preferably 4 or smaller. Chemical formula (1-1) corresponds to a structure in which n in Chemical formula (1-2) is 1.

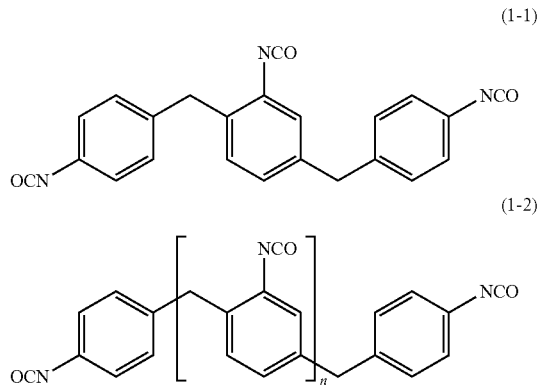

The content of the trifunctional or higher polyfunctional isocyanate in the polyisocyanate is preferably from 0.5 mass % to 20.0 mass %, and more preferably from 1.0 mass % to 19.5 mass %.

Ordinarily used catalysts for polyurethane elastomer curing can be used as the catalyst; examples thereof include tertiary amine catalysts. Concrete examples include specifically the following. Aminoalcohols such as dimethylethanolamine, N,N,N'-trimethylaminopropylethanolamine and N,N'-dimethylhexanolamine; trialkylamines such as triethylamine; tetraalkyldiamines such as N,N,N'N'-tetramethyl-1,3-butanediamine; as well as triethylenediamine, piperazine-based compounds and triazine-based compounds. Organic acid salts of metals such as potassium acetate and potassium octylate alkali can also be used. Metal catalysts ordinarily used in urethanization, for instance dibutyltin dilaurate, can likewise be used. The foregoing may be used singly or in combinations of two or more types.

The starting materials that make up the elastic member may have formulated therein, besides the polyurethane, also pigments, plasticizers, waterproofing agents, antioxidants, ultraviolet absorbers, light stabilizers and so forth, as needed.

In the elastic member, the angle of the tip-side edge formed by the main surface and the leading end surface is not particularly limited, but is ordinarily from about 85 degrees to 95 degrees. In the present disclosure, moreover, the hardness of the elastic member lies preferably in the range from 65° to 90°. In the present disclosure, the hardness (IRHD) of the elastic member is a value measured in accordance with the international rubber hardness test M method, using a Wallace micro-hardness meter by H. W. Wallace & Co Limited. The international rubber hardness test M method is stipulated in JIS K 6253-1997.

One method for adjusting the coefficient of variation of the area ratios of the white regions to lie within a predetermined ranges, and adjusting the value resulting from subtracting HM1 from HM2 to lie within a predetermined range, involves forming a cured region, in accordance with a known method, on the surface of the cleaning blade.

Concrete such methods are described below, but these methods are non-limiting.

Preferably, the cured region of the elastic member includes the main surface, and the leading end surface that forms the tip side edge together with the main surface. The cured region may further include surfaces other than the above, namely a surface opposite to the main surface, and a surface on the side on which the support member is installed (surface with reference symbol 10 and surface with reference symbol 11 in FIG. 2). In this case the rigidity of both end surfaces of the elastic member can be improved, and the occurrence of tuck-up of the cleaning blade can be further curtailed.

The method for forming a cured region in the polyurethane contained in the elastic member is not particularly limited, and herein a known method, for instance a method relying on ultraviolet rays or a method that involves applying and curing a material for cured region formation, may be resorted to.

Also the degree of curing may be selected as appropriate so that the coefficient of variation of the area ratios of the white regions is adjusted to lie within a predetermined range, and the value resulting from subtracting HM2 from HM1 is adjusted to lie within a predetermined range.

As a concrete example, a method will be explained next that involves applying and curing a material for cured region formation.

The material for cured region formation can be used after being diluted with a diluting solvent as needed, and can be applied onto the cured region by resorting to a known means such as dipping, spraying, dispenser coating, brush coating, roller coating or the like.

The isocyanate compound and so forth used below can be used as material for cured region formation. In this case it suffices that to sufficiently impregnate the polyurethane contained in the elastic member with a material for cured region formation (such as an isocyanate compound). Impregnation is promoted by increasing the concentration and lowering the viscosity of the material for cured region formation, and accordingly the material for cured region formation may be heated without being diluted.

The degree of curing may be adjusted for instance depending on the duration of impregnation or immersion, the thermal treatment temperature and thermal treatment time after impregnation or immersion, and/or a subsequent standing time.

An example of a method for forming a cured region will be explained next, on the basis of an example in which an isocyanate compound is used as a material for cured region formation. The elastic member onto which the material for cured region formation is applied may in some instances be referred to as a "precursor".

As described above, the precursor may be thermally treated after application of the material for cured region formation onto the cured region. The temperature of the material for cured region formation may be set to lie in the range from about 60° C. to about 80° C. The impregnation or immersion time cannot generalized, but ranges preferably from about 10 seconds to 60 seconds.

The viscosity of the material for cured region formation present on the surface of the polyurethane is lowered as a result of the above thermal treatment, whereby permeation and diffusion of the material into the polyurethane can both be promoted.

The heating method is not particularly limited, and may be a method that involves causing a precursor to pass through a heating furnace, or a method that involves blowing a hot air current onto a precursor. Heating furnaces include for instance radiant heating furnaces and circulating air heating furnaces, while devices for forming hot air currents include hot air blowers and far infrared heaters.

The cured region becomes wider, which translates into higher elasticity, by setting heating conditions to a high temperature and/or to a long heating time. Among preferred heating conditions, the surface temperature of the treated surface is set for instance to lie in the range from 90° C. to 110° C. Preferably, the heating time is for instance set to lie in the range of 10 minutes to 30 minutes.

In addition, the amount of residual isocyanate during polyurethane molding tends to gradually decrease with time after molding. Therefore, though not limited thereto, the cured region may be formed immediately after molding of the polyurethane. For instance, the cured region may be formed within 3 hours after polyurethane molding. The amount of residual isocyanate can be adjusted also on the basis of the mixing ratio of the composition used at the time of formation of the polyurethane.

The material for cured region formation is not particularly limited so long as it allows the polyurethane to be cured, and a cured region to be formed on the surface of polyurethane.

Examples of the material include isocyanate compounds and acrylic compounds. The material for cured region formation may be used after having been diluted with a solvent or the like. The solvent used for dilution is not particularly limited so long as it dissolves the material that is used, and examples thereof include toluene, xylene, butyl acetate, methyl isobutyl ketone and methyl ethyl ketone.

In a case where the polyurethane constituent material is a polyurethane elastomer, an isocyanate compound being a constituent material of polyurethane elastomers may be used as the material that forms the cured region, in terms of compatibility with the polyurethane and impregnation into the polyurethane.

An isocyanate compound having one or more isocyanate groups in the molecule can be used herein as the isocyanate compound that is brought into contact with the polyurethane.

Examples of isocyanate compounds having one isocyanate group in the molecule include aliphatic monoisocyanates such as octadecyl isocyanate (ODI) and aromatic monoisocyanates such as phenylisocyanate (PHI).

As an isocyanate compound having two isocyanate groups in the molecule there may be used a compound ordinarily utilized in the production of polyurethane resins; examples of such compounds include the following.

2,4-tolylene diisocyanate (2,4-TDI), 2,6-tolylene diisocyanate (2,6-TDI), 4,4'-diphenylmethane diisocyanate (MDI), m-phenylene diisocyanate (MPDI), tetramethylene diisocyanate (TMDI), hexamethylene diisocyanate (HDI) and isophorone diisocyanate (IPDI).

For instance 4,4',4"-triphenylmethanetriisocyanate, 2,4,4'-biphenyltriisocyanate, 2,4,4'-diphenylmethanetriisocyanate or the like can be used as an isocyanate compound having three or more isocyanate groups in the molecule.

The isocyanate compounds having two or more isocyanate groups in the molecule can also be used in the form of modified derivatives or multimers thereof. Herein MDI exhibiting high crystallinity, i.e. a symmetrical structure, is preferred in order to efficiently increase the hardness of the cured region; more preferred, in terms of workability, is MDI including a modified product, since MDI is then liquid at normal temperature.

Ordinarily, a portion resulting from impregnation of a polyurethane with an isocyanate and curing, and a portion resulting from curing of an isocyanate or the like on the surface of the polyurethane, coexist in the cured region.

The method for producing the cleaning blade is not particularly limited, and may be selected from among known suitable methods. As the method for producing the elastic member an appropriate method may be selected from among known methods such as mold molding and centrifugal molding.

For instance a support member onto which an adhesive is applied at a region of contact with the elastic member is disposed in a mold for cleaning blade molding provided with a cavity for forming the elastic member.

Meanwhile, a prepolymer obtained by partially polymerizing a polyisocyanate and a polyol, plus a curing agent containing a polyol, a chain extender, a catalyst and other additives are charged into a casting machine. The foregoing are mixed and stirred at a constant ratio, using a mixing chamber or the like, to yield a starting material composition such as a polyurethane elastomer. This starting material composition is injected into the above mold, to form a cured molded product (elastic member) on the adhesive-coated surface of the support member, with reaction curing followed by demolding. As the case may require the elastic member is cut as appropriate for the purpose of ensuring predetermined dimensions as well as a predetermined edge dimensional accuracy of the contact region of the elastic member; thereby a cleaning blade precursor can be produced in which the support member and the elastic member are molded integrally with each other.

In another method, two support members coated with an adhesive are disposed facing each other in the cavity of the mold, whereupon the starting material composition is injected into the mold from an opening in the end surface thereof in the longitudinal direction; a curing reaction is then conducted at 100° C. to 150° C., to yield a molded article in which the two support members are integrated together by way of a polyurethane elastomer. In another method, the urethane portion of the molded article is then separated into two pieces through cutting along the central portion in the transverse direction; the urethane portion is further cut off along both ends in the longitudinal direction of the holder, to thereby produce two cleaning blades.

At the time of injection of the starting material composition into the cavity of the mold, the mold is preferably tilted by an angle of 5° to 20° so that the starting material composition flows first through one of the two support members. By setting the inclination angle to lie within the above range, air is unlikelier to be entrained in the middle of the two blades. Also, the starting material composition can be prevented from becoming cured before reaching the end of the cavity on account of slow flow of the starting material composition at the time of injection. Moreover, the filling time can be shortened, and the occurrence of insufficient filling can be further suppressed, by setting the inclination angle of the tilted mold to 0° prior to injection of the starting material composition into the mold is complete.

In a case where the elastic member is produced using a centrifugal molding machine, a prepolymer obtained by partially polymerizing a polyisocyanate and a polyol, plus a curing agent containing a polyol, a chain extender, a catalyst and other additives are mixed and stirred, to yield a starting material composition. The starting material composition is charged into a rotating drum, to yield a polyurethane elastomer sheet. This polyurethane elastomer sheet is cut for the purpose of ensuring predetermined dimensions as well as a predetermined edge dimensional accuracy of the contact region of the elastic member. The polyurethane elastomer sheet (elastic member) thus obtained can be affixed to a support member coated with an adhesive, to produce a cleaning blade precursor.

The cured region can be formed in accordance with the methods already explained above. Specifically, firstly a material for cured region formation is applied onto the main surface and leading end surface of the elastic member of the cleaning blade precursor. The coated portion is then thermally treated for instance at a temperature of 90° C. or above, for 10 minutes or longer. A cured region can be formed as a result on the surface and the interior of the coated portion.

In a case where the elastic member needs to be cut in order to form the tip side edge on the cleaning blade, the cured region may be formed before or after such cutting. In the case of centrifugal molding, a cured region may be formed prior to joining to the support member. A cleaning blade can thus be obtained as described above.

<Process Cartridge and Electrophotographic Image Forming Apparatus>

A cleaning blade according to the present disclosure can be used by being built into a process cartridge for an electrophotographic image forming apparatus. A process cartridge according to the present disclosure is a process cartridge having an electrophotographic cleaning blade according to the present disclosure.

The foregoing can be used by being built into an electrophotographic image forming apparatus. An electrophotographic image forming apparatus according to the present disclosure is an electrophotographic image forming apparatus having the electrophotographic cleaning blade according to the present disclosure.

EXAMPLES

The present disclosure will be explained below by way of production examples, working examples and comparative examples, but the disclosure is not limited in any way by these examples. Reagents or industrial chemicals were used as starting materials, besides those listed in the examples and comparative examples. Unless otherwise specified, the language "parts" in the examples and comparative examples refers to mass basis throughout.

<Methods for Measuring and Calculating Area Ratios M1 to M100, an Average Value AM of Area Ratios, a Standard Deviation Σ of Area Ratios, and a Coefficient of Variation (100×Σ/AM)>

The measurements were performed using a scanning probe microscope (hereafter SPM), with calculations in accordance with the method below.

The scanning probe microscope (SPM) used herein was MFP-3D Origin (by Oxford Instruments plc).

The method for preparing a measurement sample was as follows.

Assuming that a first line segment is drawn on the leading end surface of the cleaning blade parallelly to the tip side edge and at a distance of 10 μm from the tip side edge, and the length of the first line segment is defined as L, and a point at ½L from one end side on the first line segment is defined as P1, there was cut out a 2-mm square measurement sample, of the leading end surface, with barycenter at P1 and having one side parallel to the first line segment. A cryomicrotome (UC-6 (product name), by Leica Microsystems GmbH) was used to cut out, from the above measurement sample, at −50° C., a 100-μm square polyurethane flake with barycenter at P1, having one side parallel to the first line segment, and having a thickness of thickness of 1 μm. A measurement sample was thus prepared. The obtained measurement sample was placed on a smooth silicon wafer and was allowed to stand for 24 hours in an environment at room temperature of 25° C. and humidity of 50%.

Next, the silicon wafer having the measurement sample placed thereon was set on an SPM stage, and an SPM observation was performed. The spring constant and proportionality constant of a silicon-made cantilever (product name: OMCL-AC160, by Olympus Corporation, tip curvature radius: 8 nm) were ascertained beforehand in accordance with a thermal noise method with an SPM device, as follows (spring constant: 30.22 nN/nm, proportionality constant: 82.59 nm/V).

The cantilever was tuned beforehand, and resonance frequencies of the cantilever were determined (285 KHz (first order) and 1.60 MHz (higher order)).

The measurement mode of the SPM was an AM-FM viscoelasticity mapping mode, the free amplitude of the cantilever was set to 3 V (first order) and 25 mV (higher order), the set point amplitude was set to 2 V (first order), and, with barycenter at the P1, a side length was 20 μm, a square (20 μm×20 μm) region having one side parallel to the first line segment was scanned under conditions that involve a scanning speed of 1 Hz, and 256 vertical and 256 horizontal scanning points, whereupon a 256-gradation grayscale phase image was acquired, as a viscoelastic image of the above region.

The obtained phase image was binarized using an image processing analysis system (product name: Luzex-AP, by Nireco Corporation). Specifically, a threshold value was set at a 93rd gradation from the lowest gradation side in a brightness frequency distribution obtained from the phase image, and a binarized image was created thereupon with portions at or above the threshold value being depicted in black and portions below the threshold value being depicted in white. The binarized image was further divided into 100 sections (M1 to M100) each being a 2-μm-side square, and the area ratio (M1 to M100) of the white region in each section (M1 to M100) and an average value AM of the area ratios of the white regions and a standard deviation/of the area ratios of the white regions were worked out, and a coefficient of variation (100×Σ/AM: units "%") of the area ratios of the white regions was further calculated.

<Method for Measuring Martens Hardness>

Martens hardness was measured in accordance with the following method.

Assuming that a first line segment is drawn on the leading end surface of the cleaning blade parallelly to the tip side edge and at a distance of 10 μm from the tip side edge, the length of the first line segment is defined as L, and a point at ½L from one end side on the first line segment is defined as P1, HM1 is defined as the Martens hardness of the elastic member measured at the position of P1.

Meanwhile, assuming that a bisector of an angle formed by the main surface and the leading end surface, on a cross section, of the elastic member, perpendicular to the leading end surface and the tip side edge and that encompasses P1 is drawn, HM2 is defined as the Martens hardness of the elastic member as measured at a position that is 500 μm distant from the tip side edge, on the bisector.

- Micro-hardness meter: model DUH-211S, by Shimadzu Corporation
- Measurement environment: temperature 23±5° C.
- Measurement indenter: triangular pyramid indenter 115° (ridge angle)115°
- Measurement mode: depth setting test
- Depth setting: 2 μm
- Load rate: 0.03 mN/s
- Holding time: 5 seconds
- Calculation expression: Martens hardness=1000F/26.43$h^2$ (N/mm$^2$)
- F: test force (mN), h: indentation depth (μm)

In the present example a cleaning blade of integral molding type depicted in FIG. 1 was produced and evaluated.

Example 1

<Support Member>

A galvanized steel sheet having a thickness of 1.6 mm was prepared and worked to yield a support member having an L-shaped cross section, denoted reference symbol 3 in FIG. 2. A urethane-metal one-layer adhesive (product name: Chemlock 219, by LORD Corporation) was applied onto the site of the support member with which the elastic member came into contact.

<Preparation of an Elastic Member Starting Material>

The materials given in Table 1 below were mixed and caused to react at a temperature of 80° C. for 3 hours, to yield a prepolymer having an NCO content of 10.0 mass %.

TABLE 1

| Material | Amount (parts) |
| --- | --- |
| 4,4'-diphenylmethane diisocyanate (product name: Millionate MT, by Tosoh Corporation) (*hereafter referred to as "4,4'-MDI") | 220.2 |
| Polymeric MDI (product name: Millionate MR-400, by Tosoh Corporation) (*hereafter referred to as "MR400") | 180.0 |
| Butylene adipate polyester polyol (product name: Nippollan 3027, by Tosoh Corporation, number-average molecular weight 2500) (*hereafter referred to as "PBA2500") | 599.8 |

A curing agent was prepared by mixing the materials illustrated in Table 2 below.

TABLE 2

| Material | Amount (parts) |
| --- | --- |
| Trimethylolpropane (by Tokyo Chemical Industry Co., Ltd.) (*hereafter referred to as "TMP") | 50.3 |
| Hexylene adipate polyester polyol (product name: Nippollan 164, by Tosoh Corporation, number-average molecular weight 1000) (*hereafter referred to as "PHA1000") | 285.0 |
| Polycat46 (product name, by Air Products Japan, Inc.) | 0.13 |
| N,N'-dimethylhexanolamine (product name: Kaolizer No. 25, by Kao Corporation) (*hereafter referred to as "No. 25") | 0.55 |

A starting material composition for a polyurethane elastomer was prepared by mixing the above prepolymer and the above curing agent.

The site of the support member prepared above and having had the adhesive applied thereonto was disposed so as to protrude into the cavity of a mold for cleaning blade molding. The starting material composition was then injected into the mold for cleaning blade molding, and was cured at a temperature of 130° C. for 2 minutes. This was followed by demolding, to yield an integrally molded body of the polyurethane elastomer and the support member. Prior to molding, the mold for cleaning blade molding was coated beforehand with a release agent A. Release agent A is a mixture of materials given in Table 3.

TABLE 3

| Material | Amount |
| --- | --- |
| ELEMENT 14 PDMS 1000-JC (product name: by Momentive Performance Materials Inc.) | 5.06 g |
| ELEMENT 14 PDMS 10K-JC (product name: by Momentive Performance Materials Inc.) | 6.19 g |
| SR1000 (product name: by Momentive Performance Materials Inc.) | 3.75 g |
| EXXSOL DSP145/160 (product name: by Andoh Parachemie Co., Ltd.) | 85 g |

A plate-shaped elastic member having a main surface and a leading end surface that makes up a tip side edge together with the main surface was produced by cutting the tip side of the polyurethane elastomer of the integrally molded body. The angle of the edge on the tip end side was 90 degrees, and the lengths of the elastic member in the transverse direction, thickness direction, and longitudinal direction were 7.5 mm, 1.8 mm, and 240 mm, respectively.

<Formation of the Cured Region>

Carbodiimide-modified MDI (product name: Millionate MTL, by Tosoh Corporation) was used as the material for cured region formation.

Five surfaces of the elastic member excluding the surface on which the support member was installed (reference symbol 11 in FIG. 2) were immersed for 20 seconds in the material for cured region formation having been heated to a temperature of 70° C., to apply the material for cured region formation onto the respective surfaces. The time elapsed since molding of the elastic member was completed up to the start of formation of the cured region (hereafter also referred to as "standing time") was set to 1 hour.

A sponge soaked with butyl acetate, which is a solvent, was then used to wipe the material for cured region formation off the surface of the elastic member. Next, the elastic member was thermally treated for 10 minutes at a temperature of 100° C. in an electric furnace, to cause the material for cured region formation, with which the elastic member had been impregnated, to diffuse into the interior of the elastic member and become cured. A cleaning blade 1 was thus obtained in which cured regions were formed at five surfaces of the elastic member (main surface, leading end surface, surface opposite to the main surface, and both end surface in the longitudinal direction)), as well as in the interior of the elastic member under these surfaces.

The obtained cleaning blade was evaluated in accordance with the methods below. Table 4 illustrates the results of the various evaluations.

[Evaluation 1] Average Value AM of Area Ratios of White Regions and Coefficient of Variation of Area Ratios of White Regions The area ratios M1 to M100 of the white regions relative to the surface area of each section (M1 to M100) was worked out, and the average value AM of the area ratios of the white regions, as well as the standard deviation/of the area ratios of the white regions, were calculated in accordance with the with the measurement and calculation methods described above. From the obtained results the coefficient of variation of the area ratios of the white regions was calculated as per (100×Σ/AM: unit "%").

[Evaluation 2] Martens Hardness Difference

Herein a Martens hardness difference was worked out in accordance with the measurement method described above.

[Evaluation 3] Evaluation of the Performance of the Cleaning Blade

<Production of Toner 1>

(Step of Preparing Aqueous Medium 1)

Herein 14.0 parts of sodium phosphate (dodecahydrate, by Rasa Industries, Ltd.) were added to 650.0 parts of ion-exchanged water in a reaction vessel equipped with a stirrer, a thermometer and a reflux tube, and the whole was held for 1.0 hour at 65° C. while under purging with nitrogen.

An aqueous solution of calcium chloride resulting from dissolving 9.2 parts of calcium chloride (dihydrate) in 10.0 parts of ion-exchanged water was charged all at once, while under stirring at 15000 rpm using a T. K. Homomixer (Tokushu Kika Kogyo Co., Ltd.), to prepare an aqueous medium that contained a dispersion stabilizer. Then 10 mass % hydrochloric acid was introduced into the aqueous medium, to adjust the pH to 5.0, and yield Aqueous medium 1.

(Step of Preparing a Polymerizable Monomer Composition)

Styrene: 60.0 parts
C. I. Pigment Blue 15:3:6.5 parts

The above materials were charged into an attritor (by Mitsui Miike Machinery Co., Ltd.), with further dispersion at 220 rpm for 5.0 hours using zirconia particles having a diameter of 1.7 mm, to prepare a pigment dispersion. The following materials were added to the pigment dispersion.

Styrene: 20.0 parts
n-butyl acrylate: 20.0 parts
Crosslinking agent (divinylbenzene): 0.3 parts
Saturated polyester resin: 5.0 parts
(Polycondensate (molar ratio 10:12) of propylene oxide-modified bisphenol A (2 mol adduct) and terephthalic acid, glass transition temperature Tg=68° C., weight-average molecular weight Mw=10000, molecular weight distribution Mw/Mn=5.12)
Fischer-Tropsch wax (melting point 78° C.): 7.0 parts The resulting product was held at 65° C., with dissolution and dispersion to homogeneity at 500 rpm, using a T. K. Homomixer (by Tokushu Kika Kogyo Co., Ltd.), to prepare a polymerizable monomer composition.

(Granulation Step)

While holding the temperature of Aqueous medium 1 at 70° C. and holding the rotational speed of the T. K. Homomixer at 15000 rpm, the polymerizable monomer composition was inputted into Aqueous medium 1, and 10.0 parts of the polymerization initiator t-butyl peroxypivalate were added. The whole was granulated, as it was, for 10 minutes in the stirring device while maintaining 15000 rpm.

(Polymerization/Distillation Step)

After the granulation step, the stirrer was replaced by a propeller stirring blade, and polymerization was conducted for 5.0 hours with the temperature held at 70° C. and while under stirring at 150 rpm; the polymerization reaction was then conducted by raising the temperature to 85° C. and by heating for 2.0 hours.

Thereafter, the reflux tube of the reaction vessel was replaced with a cooling tube, and the resulting slurry was heated up to 100° C. and was distilled for 6 hours, to distill off unreacted polymerizable monomers, and yield a toner base particle dispersion.

(Polymerization of an Organosilicon Compound)

Herein 60.0 parts of ion-exchanged water were weighed into a reaction vessel equipped with a stirrer and a thermometer, and pH was adjusted to 4.0 using 10 mass % hydrochloric acid. The temperature was brought to 40° C. by heating while under stirring.

This was followed by addition of 40.0 parts of methyltriethoxysilane as an organosilicon compound, and stirring for 2 hours or longer, to conduct hydrolysis. The end point of hydrolysis was confirmed visually at the point in time where oil-water separation ceased and a single layer became formed; a hydrolysis solution of an organosilicon compound was then obtained through cooling.

The temperature of the obtained toner base particle dispersion was lowered down to 55° C., and thereafter 25.0 parts of the hydrolysis solution of the organosilicon compound were added thereto, to initiate polymerization of the organosilicon compound. After holding for 15 minutes, as it was, the pH was adjusted to 5.5 using a 3.0 mass % aqueous solution of sodium hydrogen carbonate. The product was maintained at 55° C. for 60 minutes while under stirring, and was then adjusted to pH 9.5 using a 3.0 mass % aqueous solution of sodium hydrogen carbonate, with further holding for 240 minutes, to yield a toner particle dispersion.

(Washing and Drying Steps)

Once the polymerization step was over, the toner particle dispersion was cooled, and hydrochloric acid was added to the toner particle dispersion, to adjust the pH to 1.5 or lower, whereupon the dispersion was allowed to stand for 1 hour while under stirring, followed by solid-liquid separation using a pressure filter, to yield a toner cake. This toner cake was reslurried with ion-exchanged water to form a dispersion once more, whereupon solid-liquid separation was carried out using the above filter, and yield a toner cake.

The obtained toner cake was dried and classified in a thermostatic bath at 40° C. for 72 hours, to yield Toner 1.

<Evaluation of Cleaning Performance>

As a cleaning blade of a photosensitive drum which was the member to be cleaned, the cleaning blade 1 was built into a cyan cartridge of a color laser printer (product name: HP LaserJet Enterprise Color M553dn, by The Hewlett-Packard Company).

The toner in the developing machine of the cyan cartridge was wholly replaced with Toner 1 described above.

Then 12500 images, as the number of printable sheets, were formed (hereinafter referred to as "normal evaluation") under a low-temperature, low-humidity environment (temperature of 15° C., relative humidity of 10%).

In the developing machine that was used the toner was then replaced with a new cyan cartridge having had all the toner thereof replaced with Toner 1; then 12500 images, as the number of printable sheets, were formed once more (hereinafter referred to as "double evaluation").

A hole was opened at the back of the cartridge, and the evaluation was carried out while sucking out waste toner as appropriate. The obtained images were evaluated according to the following criteria.

Rank A: Image defects (streaks on the image) caused by the cleaning blade do not occur in either the normal evaluation or the double evaluation.

Rank B: Image defects (streaks on image) caused by the cleaning blade do not occur in the normal evaluation, but occur slightly in the double evaluation (streak length of 5 mm or less).

Rank C: Image defects (streaks on the image) caused by the cleaning blade do not occur in the normal evaluation, but do occur in the double evaluation (streak length exceeding 5 mm, up to 10 mm).

Rank D: Image defects (streaks on image) caused by the cleaning blade do not occur in the normal evaluation, but do occur (in excess of 10 mm) in the double evaluation.

Rank E: Image defects (streaks on image) caused by the cleaning blade occur in both the normal evaluation and the double evaluation.

An evaluation was performed in the same way as in the evaluation above, but herein the rotational speed of the photosensitive drum in the above evaluation was modified from 170 rpm to 300 rpm.

[Evaluation 4] Evaluation of Cleaning Blade Tuck-Up

No tuck-up or abnormal sound occurred in the above cleaning performance.

In Evaluation 4, cleaning blade tuck-up was evaluated under process conditions of increased speed, and over long-term use, as follows.

As a cleaning blade for a photosensitive drum which was the member to be cleaned, the cleaning blade 1 was built into a new cyan cartridge, different from that for cleaning performance evaluation. The toner in the developing machine of the cyan cartridge was wholly replaced with Toner 1 described above. Then the 15000 images were formed under a low-temperature environment (temperature 0° C.).

Thereafter, the cartridge removed from the developing machine was set in an idle rotating machine (device fitted with a jig for holding the cartridge while the photosensitive drum is caused to rotate). The photosensitive drum was caused to idly rotate at a rotational speed 170 rpm under the same environment, and the state of the tip portion of the cleaning blade was observed over 10 minutes. This observation was performed upon processing of the cartridge and installing of a CCD camera. The evaluation was carried out according to the criteria below.

Rank A: No occurrence of either tuck-up or abnormal sound (chattering sound).

Rank B: No occurrence of tuck-up, but slight occurrence of abnormal sound (chattering sound)

Rank C: No occurrence of tuck-up, but occurrence of abnormal sound (chattering sound)

Rank D: Occurrence of tuck-up.

An evaluation was performed in the same way as in the evaluation above, but herein the rotational speed of the photosensitive drum in the above evaluation was modified from 170 rpm to 300 rpm.

Examples 2 to 12

Cleaning blades 2 to 12 were obtained in the same way as in Example 1, but herein the temperature of the material for cured region formation, the immersion time, and the thermal treatment temperature, thermal treatment time and standing time (lapse of time from molding of the elastic member up to formation of the cured region) involved in the formation of the cured region were modified to the conditions given in Table 4.

Example 13

A cleaning blade according to the present example was produced in the same way as in Example 1, but herein the cured region was imparted only to the leading end surface. Specifically, the material for cured region formation used in Example 1 was heated to a temperature of 80° C. and was applied to the leading end surface of the elastic member using a dispenser. The standing time from completion of molding of the elastic member up to the start of formation of the cured region was set to 1 hour. Once the application of the material for cured region formation was complete, the integrally molded body was allowed to stand for 10 minutes in an environment at a temperature of 25° C. and a relative humidity of 50%. This integrally molded body was then thermally treated at a temperature of 100° C. in an electric furnace for 10 minutes, to cause the material for cured region formation, with which the elastic member had been impregnated, to diffuse into the interior of the elastic member and become cured. Cleaning blade 13 according to the present example was thus obtained.

Table 4 sets out evaluation results of the cleaning blades according to Examples 1 to 13.

TABLE 4

|  |  | Example | | | | | | |
|---|---|---|---|---|---|---|---|---|
|  |  | 1 | 2 | 3 | 4 | 5 | 6 | 7 |
| Cleaning blade No. |  | 1 | 2 | 3 | 4 | 5 | 6 | 7 |
| Time from elastic member molding to cured region formation | Hours | 1 | 0.5 | 1 | 1 | 3 | 1 | 1 |
| Temperature of material for cured region formation | ° C. | 70 | 60 | 60 | 60 | 70 | 70 | 70 |
| Immersion time | Seconds | 20 | 30 | 10 | 20 | 10 | 10 | 30 |
| Thermal treatment temperature | ° C. | 100 | 90 | 90 | 90 | 110 | 100 | 90 |
| Thermal treatment time | Minutes | 10 | 10 | 10 | 30 | 30 | 30 | 10 |
| Average value of area ratios of white regions: AM | % | 60.7 | 52.5 | 48.3 | 58.1 | 70.4 | 58.3 | 60.3 |

TABLE 4-continued

| | | | | | | | | |
|---|---|---|---|---|---|---|---|---|
| Standard deviation of area ratios of white regions: Σ | | 5.8 | 7.1 | 6.8 | 5.6 | 6.8 | 5.7 | 5.1 |
| Coefficient of variation of area ratios of white regions | | 9.56 | 13.52 | 14.08 | 9.64 | 9.66 | 9.78 | 8.46 |
| Value of subtraction of HM2 from HM1 | N/mm² | 0.18 | 0.15 | 0.12 | 0.15 | 0.30 | 0.16 | 0.18 |
| Cleaning performance | 170 rpm | B | C | C | B | A | B | B |
| | 300 rpm | B | C | C | B | A | B | B |
| Tuck-up evaluation | 170 rpm | B | C | C | B | A | B | B |
| | 300 rpm | B | C | C | B | A | B | B |

| | | Example | | | | | |
|---|---|---|---|---|---|---|---|
| | | 8 | 9 | 10 | 11 | 12 | 13 |
| Cleaning blade No. | | 8 | 9 | 10 | 11 | 12 | 13 |
| Time from elastic member molding to cured region formation | Hours | 3 | 3 | 3 | 3 | 0.5 | 1 |
| Temperature of material for cured region formation | ° C. | 70 | 60 | 60 | 60 | 60 | 80 |
| Immersion time | Seconds | 10 | 10 | 10 | 10 | 10 | — |
| Thermal treatment temperature | ° C. | 90 | 110 | 100 | 90 | 90 | 100 |
| Thermal treatment time | Minutes | 10 | 30 | 30 | 30 | 10 | 10 |
| Average value of area ratios of white regions: AM | % | 58.9 | 66.8 | 56.3 | 58.6 | 40.5 | 47.3 |
| Standard deviation of area ratios of white regions: Σ | | 5.2 | 5.4 | 7.3 | 5.1 | 6.1 | 7.2 |
| Coefficient of variation of area ratios of white regions | | 8.83 | 8.08 | 12.97 | 8.70 | 15.06 | 15.22 |
| Value of subtraction of HM2 from HM1 | N/mm² | 0.15 | 0.27 | 0.12 | 0.14 | 0.12 | 0.12 |
| Cleaning performance | 170 rpm | B | A | C | B | C | C |
| | 300 rpm | B | A | C | B | C | D |
| Tuck-up evaluation | 170 rpm | B | A | C | B | C | C |
| | 300 rpm | B | A | C | B | C | C |

Comparative Example 1

Cleaning blade H1 according to the present comparative example was produced in the same way as in Example 1, but herein no cured region was formed.

Comparative Example 2

<Preparation of an Elastic Member Starting Material>

The materials given in Table 5 below were caused to react at a temperature of 80° C. for 3 hours, while under stirring, to yield a prepolymer having an NCO content of 8.50%.

TABLE 5

| Material | Amount (parts) |
|---|---|
| 4,4'-MDI | 336.3 |
| Butylene adipate polyester polyol (product name: Nippollan 4010, by Tosoh Corporation, number-average molecular weight 2000) (*hereafter referred to as "PBA2000") | 663.7 |

A curing agent was prepared by mixing the materials in Table 6 below.

TABLE 6

| Material | Amount (parts) |
|---|---|
| Hexylene adipate polyester polyol (product name: Nippollan 164, by Tosoh Corporation, number-average molecular weight 1000) (*hereafter referred to as "PHA1000") | 100.8 |
| 1,4-butanediol (by Tokyo Chemical Industry Co., Ltd.) | 39.1 |
| Trimethylolpropane (by Tokyo Chemical Industry Co., Ltd.) (*hereafter referred to as "TMP") | 72.6 |
| Polycat46 (product name: by Air Products and Chemicals, Inc.) | 0.04 |
| N,N'-dimethylhexanolamine (product name: Kaolizer No. 25, by Kao Corporation) (No. 25) | 0.38 |

A starting material composition for a polyurethane elastomer was obtained by mixing the above prepolymer and the above mixture. Cleaning blade H2 according to the present comparative example was obtained in the same manner as in Example 1, but using herein the starting material composition thus obtained.

Comparative Example 3

Cleaning blade H3 was obtained in the same way as in Comparative example 2, but herein the temperature of the material for cured region formation, the immersion time, and the thermal treatment temperature, thermal treatment time and standing time (lapse of time from molding of the elastic member up to formation of the cured region) involved in the formation of the cured region were modified to the conditions given in Table 7.

Table 7 sets out evaluation results of the cleaning blades according to Comparative examples 1 to 3.

TABLE 7

| | | Comparative Example | | |
|---|---|---|---|---|
| | | 1 | 2 | 3 |
| Cleaning blade No. | | H1 | H2 | H3 |
| Time from elastic member molding to cured region formation | Hours | — | 1 | 12 |
| Temperature of material for cured region formation | ° C. | — | 70 | 50 |
| Immersion time | Seconds | — | 20 | 10 |
| Thermal treatment temperature | ° C. | — | 100 | 80 |
| Thermal treatment time | Minutes | — | 10 | 5 |
| Average value of area ratios of white regions: AM | % | 40.3 | 43.2 | 45.2 |
| Standard deviation of area ratios of white regions: Σ | | 7.8 | 12.6 | 11.8 |
| Coefficient of variation of area ratios of white regions | | 19.35 | 29.17 | 26.10 |
| Value of subtraction of HM2 from HM1 | N/mm² | 0.00 | 0.12 | 0.06 |
| Cleaning performance | 170 rpm | A | A | E |
| | 300 rpm | C | E | E |

TABLE 7-continued

|  |  | Comparative Example | | |
|---|---|---|---|---|
|  |  | 1 | 2 | 3 |
| Tuck-up evaluation | 170 rpm | A | A | D |
|  | 300 rpm | D | D | D |

The present disclosure is not limited to the embodiments above, and can accommodate various modifications and alterations without departing from the spirit and scope of the disclosure. Accordingly, the claims below are appended herein to for the purpose of making public the scope of the present disclosure.

What is claimed is:

1. An electrophotographic cleaning blade comprising:
an elastic member containing polyurethane; and
a support member supporting the elastic member,
the electrophotographic cleaning blade cleaning a surface of a member to be cleaned in motion, by contact of part of the elastic member against the surface of the member to be cleaned,
wherein:
when a side of the cleaning blade that comes in contact with the surface of the member to be cleaned is defined as a tip side of the cleaning blade, the elastic member has, at least on the tip side, a plate shape having a main surface facing the member to be cleaned and a leading end surface that forms a tip side edge together with the main surface;
assuming that a first line segment having a distance of 10 μm from the tip side edge is drawn on the leading end surface in parallel with the tip side edge,
a length of the first line segment is denoted as L, and
a point at ½L from one end side on the first line segment is denoted as P1;
when scanning of a square region of the leading end surface, the square region having a barycenter at the P1, having a side length of 20 μm and having one side parallel to the first line segment, by using a scanning probe microscope under conditions that involve a scanning speed of 1 Hz, and 256 vertical and 256 horizontal scanning points, to acquire a 256-gradation grayscale phase image, as a viscoelastic image of the square region,
creating a binarized image with a threshold value at a 93rd gradation from a lowest gradation side in a brightness frequency distribution obtained from the phase image so that portions at or above the threshold value are depicted in black and portions below the threshold value are depicted in white,
partitioning the binarized image into 100 sections each being a 2-μm-side square, and
obtaining a coefficient of variation of area ratios of white regions in each of the sections on the basis of the area ratios, an average value AM of the area ratios of the white regions, and a standard deviation Σ of the area ratios of the white regions,
the coefficient of variation is 20.00 or less, and
assuming that a bisector of an angle formed by the main surface and the leading end surface on a cross section of the elastic member is drawn, the cross section being orthogonal to the leading end surface encompassing the P1 and to the tip side edge,
a value of HM1-HM2 is larger than 0.10 N/mm$^2$, where HM1 is a Martens hardness of the elastic member as measured at a position of the P1, and HM2 is a Martens hardness of the elastic member as measured at a position on the bisector at a distance of 500 μm from the tip side edge.

2. The electrophotographic cleaning blade according to claim 1, wherein the average value AM of the area ratios of the white regions is 45.0% or higher.

3. The electrophotographic cleaning blade according to claim 1, wherein the polyurethane comprises a reaction product of a composition comprising an isocyanate compound that includes a trifunctional or higher polyfunctional isocyanate.

4. The electrophotographic cleaning blade according to claim 1, wherein the polyurethane comprises a reaction product of a composition comprising an isocyanate compound including a diisocyanate and a trifunctional or higher polyfunctional isocyanate, and an alcohol including a trifunctional or higher polyfunctional alcohol.

5. A process cartridge comprising an electrophotographic cleaning blade,
wherein the electrophotographic cleaning blade comprises an elastic member that contains polyurethane and a support member that supports the elastic member, the electrophotographic cleaning blade cleaning a surface of a member to be cleaned in motion, by contact of part of the elastic member against the surface of the member to be cleaned, and
wherein:
when a side of the cleaning blade that comes in contact with the surface of the member to be cleaned is defined as a tip side of the cleaning blade, the elastic member has, at least on the tip side, a plate shape having a main surface facing the member to be cleaned and a leading end surface that forms a tip side edge together with the main surface;
assuming that a first line segment having a distance of 10 μm from the tip side edge is drawn on the leading end surface in parallel with the tip side edge,
a length of the first line segment is denoted as L, and
a point at ½L from one end side on the first line segment is denoted as P1;
when scanning of a square region of the leading end surface, the square region having a barycenter at the P1, having a side length of 20 μm and having one side parallel to the first line segment, by using a scanning probe microscope under conditions that involve a scanning speed of 1 Hz, and 256 vertical and 256 horizontal scanning points, to acquire a 256-gradation grayscale phase image, as a viscoelastic image of the square region,
creating a binarized image with a threshold value at a 93rd gradation from a lowest gradation side in a brightness frequency distribution obtained from the phase image so that portions at or above the threshold value are depicted in black and portions below the threshold value are depicted in white,
partitioning the binarized image into 100 sections each being a 2-μm-side square, and
obtaining a coefficient of variation of area ratios of white regions in each of the sections on the basis of the area ratios, an average value AM of the area ratios of the white regions, and a standard deviation 2 of the area ratios of the white regions,
the coefficient of variation is 20.00 or less, and
assuming that a bisector of an angle formed by the main surface and the leading end surface on a cross section of the elastic member is drawn, the cross section being orthogonal to the leading end surface encompassing the P1 and to the tip side edge, a value of HM1-HM2 is larger than 0.10 N/mm², where HM1 is a Martens hardness of the elastic member as measured at a position the positon of the P1, and HM2 is a Martens hardness of the elastic member as measured at a position on the bisector at a distance of 500 μm from the tip side edge.

6. An electrophotographic image forming apparatus comprising an electrophotographic cleaning blade, wherein the electrophotographic cleaning blade comprises an elastic member that contains polyurethane and a support member that supports the elastic member, the electrophotographic cleaning blade cleaning a surface of a member to be cleaned in motion, by contact of part of the elastic member against the surface of the member to be cleaned, and wherein:

when a side of the cleaning blade that comes in contact with the surface of the member to be cleaned is defined as a tip side of the cleaning blade, the elastic member has, at least on the tip side, a plate shape having a main surface facing the member to be cleaned and a leading end surface that forms a tip side edge together with the main surface;

assuming that a first line segment having a distance of 10 μm from the tip side edge is drawn on the leading end surface in parallel with the tip side edge, a length of the first line segment is denoted as L, and a point at ½L from one end side on the first line segment is denoted as P1;

when scanning of a square region of the leading end surface, the square region having a barycenter at the P1, having a side length of 20 μm and having one side parallel to the first line segment, by using a scanning probe microscope under conditions that involve a scanning speed of 1 Hz, and 256 vertical and 256 horizontal scanning points, to acquire a 256-gradation grayscale phase image, as a viscoelastic image of the square region, creating a binarized image with a threshold value at a 93rd gradation from a lowest gradation side in a brightness frequency distribution obtained from the phase image so that portions at or above the threshold value are depicted in black and portions below the threshold value are depicted in white, partitioning the binarized image into 100 sections each being a 2-μm-side square, and obtaining a coefficient of variation of area ratios of white regions in each of the sections on the basis of the area ratios, an average value AM of the area ratios of the white regions, and a standard deviation Σ of the area ratios of the white regions, the coefficient of variation is 20.00 or less, and assuming that a bisector of an angle formed by the main surface and the leading end surface on a cross section of the elastic member is drawn, the cross section being orthogonal to the leading end surface encompassing the P1 and to the tip side edge, a value of HM1-HM2 is larger than 0.10 N/mm², where HM1 is a Martens hardness of the elastic member as measured at a position of the P1, and HM2 is a Martens hardness of the elastic member as measured at a position on the bisector at a distance of 500 μm from the tip side edge.

* * * * *